United States Patent [19]

Sato et al.

[11] 4,009,914
[45] Mar. 1, 1977

[54] ALARM SYSTEM FOR A SKID CONTROL SYSTEM

[75] Inventors: Takefumi Sato; Yuji Dohi, both of Tenri, Japan

[73] Assignee: Sharp Kabushiki Kaisha, Osaka, Japan

[22] Filed: Mar. 11, 1975

[21] Appl. No.: 557,241

[30] Foreign Application Priority Data

Mar. 12, 1974 Japan .............................. 49-28756
Apr. 3, 1974 Japan .............................. 49-38337
Mar. 25, 1974 Japan ........................ 49-34260[U]

[52] U.S. Cl. ................................. 303/92; 340/52 B
[51] Int. Cl.² .......................................... B60T 8/00
[58] Field of Search ........................ 303/21 AF, 92;
307/10 R, 94; 317/27 R, 31, 4 A; 318/563, 565; 324/73 R; 340/52 B, 53

[56] References Cited

UNITED STATES PATENTS

| | | | |
|---|---|---|---|
| 3,578,819 | 5/1971 | Atkins | 303/21 AF UX |
| 3,806,202 | 4/1974 | Ochiai | 303/21 AF |
| 3,818,433 | 6/1974 | Okamoto et al. | 303/21 AF X |
| 3,861,755 | 1/1975 | Taylor | 303/21 AF |

*Primary Examiner*—Stephen G. Kunin
*Attorney, Agent, or Firm*—Stewart and Kolasch, Ltd.

[57] ABSTRACT

In a skid control system for fluid actuated brakes of a wheeled vehicle, it is necessary to provide a fault detection unit for detecting a dangerous fault condition of the skid control system and disconnecting the skid control system from an electric source. There is also provided another fault detection unit for detecting a light fault condition of the skid control system and a fault condition of a power circuit during travel of the vehicle, and indicating the fault condition without disconnecting the skid control system from the electric source. The initial condition of the skid control system immediately after power throw is checked and the indication is carried out when the skid control system is in a normal condition, and the indication is eliminated when the velocity of the vehicle exceeds a predetermined value.

17 Claims, 2 Drawing Figures

ALARM SYSTEM FOR A SKID CONTROL SYSTEM

BACKGROUND OF THE INVENTION

The present invention relates to an alarm system of a skid control system for fluid actuated brakes of a wheeled vehicle.

A skid control system generally prevents wheels of a vehicle from being locked thereby to stop the vehicle safely. A typical skid control system is disclosed in the U.S. Pat. No. 3,511,542, A.C. FIELEK, JR., "SKID CONTROL SYSTEM INCLUDING CONTROL CIRCUIT FOR A HYDRAULIC MODULATING VALVE", issued on May 12, 1970. The skid control system operates to reduce brake pressure and, therefore, it is very dangerous when the skid control system is in a fault condition and reduces the brake pressure at an undesirable time. The skid control system usually has a fault detection unit in order to activate an alarm system and disconnect the skid control system from a power source when the skid control system is in a fault condition. The conventional fault detection system, though it is not preferable, disconnects the skid control system from the power source even when the skid control system is in a negligible fault condition, for example, when the voltage level of the power source is lower than a predetermined value. It is also required to provide an effective network for checking an initial condition of the skid control system immediately after power throw.

OBJECTS AND SUMMARY OF THE INVENTION

Accordingly, an object of the present invention is to provide a novel alarm system for indicating a light fault condition of a skid control system without the necessity for disconnecting the skid control system from a power source.

Another object of the present invention is to provide a novel alarm system of a skid control system suited for checking an initial condition of the skid control system.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objectives, pursuant to the present invention, there are provided a dangerous fault condition detection unit and a slight, namely, negligible fault condition detection unit for detecting the condition of the skid control system. The skid control system is connected with a power source through a fuse. A series circuit of an indication unit, such as an alarm lamp and an alarm buzzer, and a diode is connected to the fuse in a parallel fashion. A first switching means is connected between ground potential and a connection point of the fuse, the skid control system and the diode, whereas a second switching means is connected between ground potential and a connection point of the indication unit and the diode. The dangerous fault condition detection unit renders the first switching means conductive whereby the skid control system is disconnected from the power source due to fusing of the fuse and the indication unit is enabled. The negligible fault condition detection unit renders the second switching means conductive to enable the indication unit without disconnecting the skid control system from the power source.

There is also provided a network to enable the indication unit when the skid control system is in a normal condition immediately after power throw, and to disable the indication unit when the velocity of the vehicle exceeds a predetermined value.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
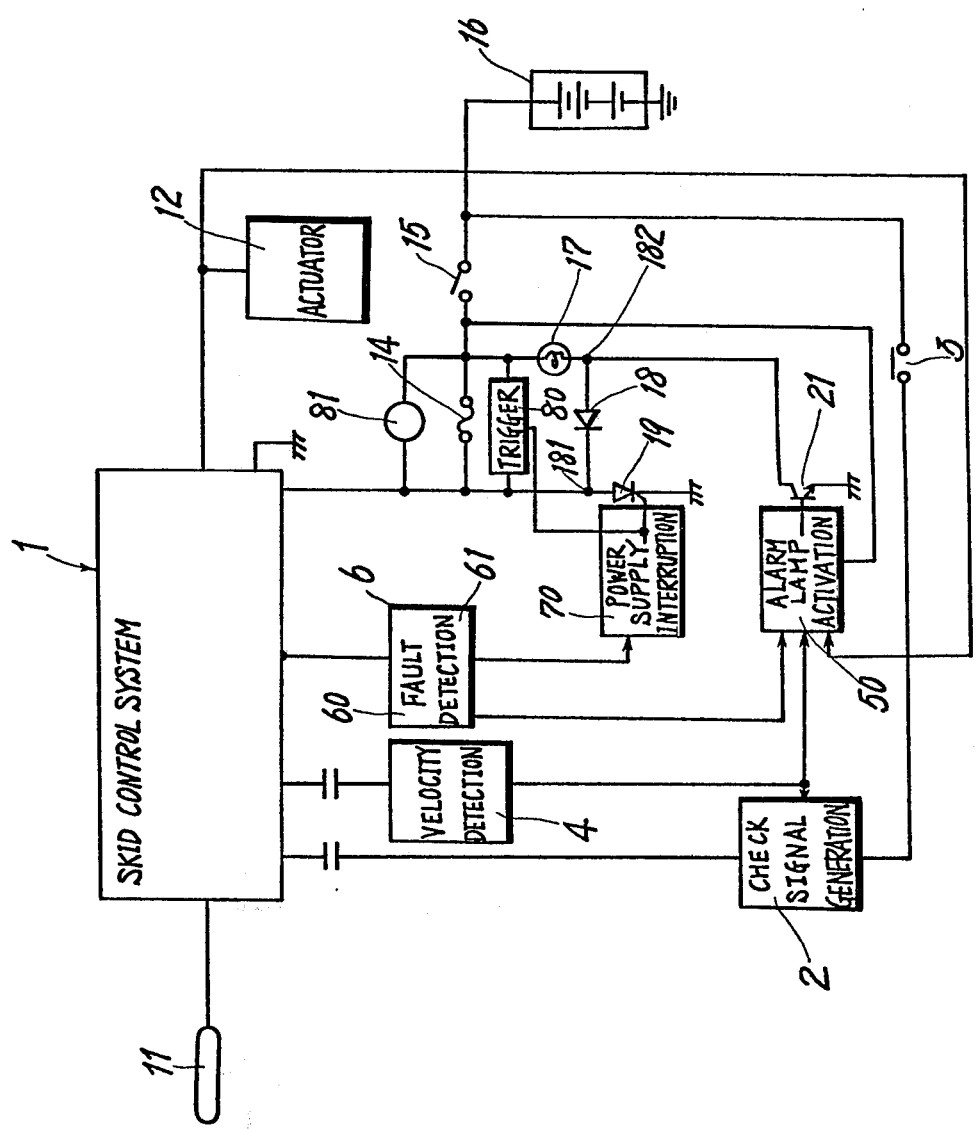
FIG. 1 is a schematic circuit diagram of a embodiment of an alarm system of the present invention.

Referring now to FIG. 1, there is illustrated an embodiment of an alarm system of the present invention for use in a skid control system. A skid control system 1 is connected to receive output signals from a wheel revolution sensor 11 attached to a wheel of a wheeled vehicle, whereas the skid control system 1 is connected with a power source 16 through a fuse 14 and a switch 15, which is an ignition switch of the wheeled vehicle. The skid control system 1 can be of a conventional construction known in the art, and since the specific details thereof do not constitute a part of the present invention they have been omitted for the purpose of simplicity. A typical construction of the skid control system is disclosed in, for example, the U.S. Pat. No. 3,511,542, A. C. FIELEK, JR., "SKID CONTROL SYSTEM INCLUDING CONTROL CIRCUIT FOR A HYDRAULIC MODULATING VALVE", issued on May 12, 1970. Output signals from the skid control system 1 render an actuator 12 active for reducing brake pressure thereby preventing a locked condition of the wheel. An alarm buzzer 81, a trigger circuit 80, and a series circuit of an alarm lamp 17 and a diode 18 are connected to the fuse 14 in parallel fashion. The diode 18 is provided in a forward direction with respect to the power source 16. A first switching means such as an SCR 19 is connected between ground potential and a connection point 181 of the fuse 14, the alarm buzzer 81, the trigger circuit 80, the skid control system 1 and the diode 18. The control electrode of the SCR 19 is connected to receive output signals from the trigger circuit 80 and a power supply interrupting circuit 70, which will be described in detail later. A second switching means such as a transistor 21 is connected between ground potential and the connection point 182 of the alarm lamp 17 and the diode 18. The base electrode of the transistor 21 is connected to receive output signals from an alarm lamp activating circuit 50, a detailed circuit construction of which will be described later.

A fault detection circuit 6 includes a dangerous fault condition detection unit 61 and a negligible fault condition detection unit 60, the details of which will be described later with reference to FIG. 2. The dangerous fault condition detection unit 61 is connected to receive output signals from the skid control system 1, and activates the power supply interrupting circuit 70 when the skid control system 1 is placed in the dangerous fault condition. Output signals from the negligible fault condition detection unit 60 are applied to the alarm lamp activating circuit 50.

When the skid control system is in the normal condition during travel of the vehicle, neither the power supply interrupting circuit 70 nor the alarm lamp activating circuit 50 are enabled and, therefore, neither the alarm lamp 17 nor the alarm buzzer 81 will be activated. When the skid control system 1 is in a dangerous fault condition the dangerous fault condition detection unit 61 generates signals for activating the power supply interrupting circuit 70, which renders the SCR 19 conductive, whereby the fuse 14 is fused and both of the alarm lamp 17 and the alarm buzzer 81 are enabled. In this way, the skid control system 1 is disconnected from the power source 16, and the alarm lamp 17 and the alarm buzzer 81 are energized when the skid control system 1 is placed in the dangerous fault condition during travel of the vehicle. When the skid control system 1 is placed in the negligible fault condition during travel of the vehicle, the negligible fault condition detection unit 60 renders the transistor 21 conductive through the alarm lamp activating circuit 50, whereby only the alarm lamp 17 is enabled without disconnecting the skid control system 1 from the power source 1.

The present alarm system includes a network suited for checking an initial condition of the skid control system. The initial check network comprises a stop switch 3 associated with a brake foot pedal (not shown), a check signal generation circuit 2, and a velocity detection circuit 4. A detailed circuit construction and operation of the present alarm system including the initial check network will be described with reference to FIG. 2.

INITIAL RESET

Figure 2:
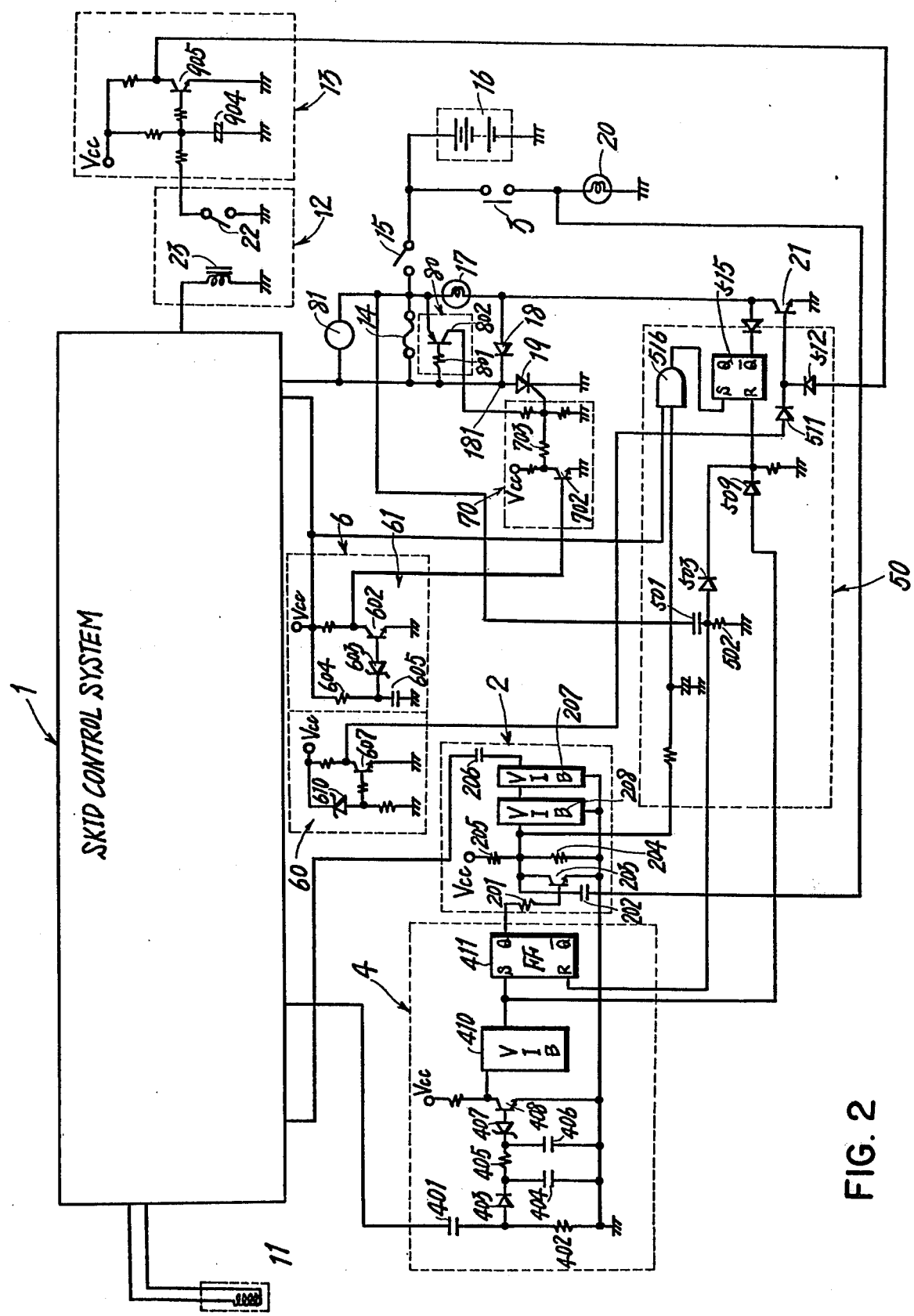
FIG. 2 is a detailed circuit diagram of the embodiment of FIG. 1.

When the ignition switch 15 in FIG. 2 is closed, a step pulse is provided for the alarm lamp activating circuit 50 and is differentiated by a capacitor 501 and a resistor 502 to produce a positive pulse. The positive pulse is applied to the reset terminal of a flip-flop 515 through a diode 503, thereby maintaining the flip-flop 515 in a reset condition. The reset output of the flip-flop 515 is at a high level and, therefore, the alarm lamp 17 is disabled. The positive pulse created by the capacitor 501 and the resistor 502 is also applied to the reset terminal of another flip-flop 411 within the velocity detection circuit 4 and, therefore, the flip-flop 411 is in a reset condition. The set output of the flip-flop 411, which is at a low level, is applied to the base electrode of a transistor 203 within the check signal generation circuit 2 through a resistor 201, and hence the transistor 203 is OFF. As discussed above, the flip-flops 411 and 515 are at their reset states, and the system is in a stable condition without enabling the alarm lamp 17 immediately after power throw.

INITIAL CHECK

Check operation as to whether the skid control system and the alarm system are in normal conditions is initiated by closing the stop switch 3. When the brake foot pedal is depressed, the stop switch 3 is closed and a stop lamp 20, which is provided at the back of the vehicle, is enabled. A step pulse applied to the stop lamp 20 is also applied to the check signal generation circuit 2, and is differentiated by a capacitor 202 and resistors 204 and 205. A positive pulse is generated at the collector of the transistor 203, which is OFF in the initial stable condition as discussed above. The positive pulse triggers an astable multivibrator 208 to generate a pulse of a predetermined pulse width and of positive polarity. The output signal from the astable multivibrator 208 activates a nonstable multivibrator 207 to generate a signal at a predetermined frequency during the time period when the astable multivibrator 208 generates the positive pulse. The signal from the nonstable multivibrator 207 is applied to the input stage of the skid control system 1 via a capacitor 206. Initiation of the oscillation of the nonstable multivibrator 207 corresponds to rapid acceleration of the wheel velocity, whereas termination of the oscillation of the nonstable multivibrator 207 corresponds to rapid deceleration of the wheel velocity. The skid control system 1 can be of a conventional construction shown in, for example, the U.S. Pat. No. 3,511,542, and generates a pressure reduction signal to be applied to the actuator 12 upon termination of the oscillation of the nonstable multivibrator 207. The collector of the transistor 203 is maintained at a high voltage level since the transistor 203 is OFF as already described. A signal from the collector of the transistor 203 and the pressure reduction signal generated from the skid control system 1 are applied to an AND circuit 516 within the alarm lamp activating circuit 50. When all of the skid control system 1, the check signal generation circuit 2, an electromagnetic valve 23 in the actuator 12, and the alarm lamp activating circuit 50 are in normal condition, the AND circuit 516 becomes ON upon receiving the pressure reduction signal from the skid control system 1, and hence the flip-flop 515 is turned to a set state. Under these conditions, the reset output of the flip-flop 515 falls to a low level and, therefore, the alarm lamp 17 is enabled to indicate that the skid control system and the alarm system are in normal condition. The reset state of the flip-flop 515 is maintained until the following condition (extinction of the alarm lamp) will occur.

EXTINCTION OF ALARM LAMP

When the vehicle starts the wheel revolution sensor 11 provides signals for a Schmitt circuit within the skid control system 1. The output signal from the Schmitt circuit, which is a rectangular wave form, is applied to the velocity detection circuit 4 through a capacitor 401, and is differentiated by the capacitor 401 and a resistor 402. Positive polarity pulses within the differentiated pulses are introduced through a diode 403 into an integration circuit comprising capacitors 404, 406 and a resistor 405 at which a pulsating current is produced to charge up the capacitor 406. When the charged voltage level of the capacitor 406 exceeds a predetermined value determined by a Zener diode 407 and a transistor 408, the transistor 408 is turned ON and, therefore, the voltage level of the collector becomes low. The variation of the collector voltage level triggers an astable multivibrator 410 to generate a pulse of a positive polarity having a short pulse width. The pulse generated by the astable multivibrator 410 is applied to the set terminal of the flip-flop 411, and renders the set output of the flip-flop 411 high and the transistor 203 ON. The output signal of the astable multivibrator 410 is also applied to the reset terminal of the flip-flop 515 through a diode 509 to raise the reset output of the flip-flop 515 a high level and, therefore, the alarm lamp 17 is extinguished. In other words, the alarm lamp 17 is disabled when the velocity of the vehicle exceeds a predetermined value. At this time the collector of the transistor 203 is at a low level and, therefore, the output of the AND circuit 516 is maintained at a low level. The flip-flop 515 can not be returned to a set state unless the ignition switch 15 is reclosed. The check signal generation circuit 2 can not generate the signal for initial check even though the stop switch 3 is closed by the brake foot pedal, since the collector voltage of the transistor 203 is at a low level.

DANGEROUS FAULT CONDITION

The dangerous fault condition of the skid control system 1 during travel of the vehicle is detected by the dangerous fault condition detection unit 61. When the skid control system 1 falls into a dangerous fault condition to cause a runaway of the vehicle, for example, when the skid control system 1 generates the pressure reduction signal for an abnormally long period, the pressure reduction signal charges a capacitor 605 via a resistor 604. When the charged voltage level exceeds a predetermined value determined by a Zener diode 603 and a transistor 602, the collector of the transistor 602 is at a low voltage level, and the collector of a transistor 702 within the power supply interrupting circuit 70 is at a high voltage level. The SCR 19 is triggered through a resistor 703, whereby the fuse 14 is fused to disconnect the skid control system 1 from the power source 16, and to enable the alarm lamp 17 and the alarm buzzer 81. When the ignition switch 15 is reclosed after the tearing of the fuse 14, a transistor 802 within the trigger circuit 80 becomes ON. This occurs because a voltage corresponding to a voltage reduction caused by the alarm buzzer 81 and the series circuit of the alarm lamp 17 and the diode 18 appears across a resistor 801 connected to the emitter and the base of the transistor 802 at the both ends thereof and, therefore, the SCR 19 is again rendered conductive. The conduction of the SCR 19 prevents the skid control system 1 from being supplied by the power from the power source 16 through the alarm buzzer 81 and the series circuit of the alarm lamp 17 and the diode 18. The alarm buzzer 81 and the alarm lamp 17 are maintained at their operative conditions.

NEGLIGIBLE FAULT CONDITION

As used herein, the term negligible fault condition refers to a light fault condition of the skid control system which can be automatically recovered in a short time, or a light fault condition of the alarm system which does not require to disconnect the skid control system from the power source. When the voltage output of the power source 16 decreases below a predetermined value determined by a Zener diode 610 within the negligible fault condition detection unit 60, a transistor 607 becomes OFF and hence the transistor 21 is turned to ON through a diode 511, thereby enabling the alarm lamp 17. When the actuator 12 is in a fault condition and a diaphragm associated with the electromagnetic valve 23 can not return to the original position, a detection switch 22, which detects the operation of the diaphragm, is kept ON and, therefore, the voltage level across a capacitor 904 within a actuator detection circuit 13 decreases to turn OFF a transistor 905. At this time the transistor 21 is turned to ON through a diode 512 and the alarm lamp 17 is enabled. In the negligible fault condition only the alarm lamp 17 is enabled. The skid control system 1 will not be disconnected from the power source 16 since the fuse 14 can not be fused.

The invention being thus described, it will be obvious that the same may be varied in many ways. Such variations are not to be regarded as a departure from the spirit and scope of the invention, and all such modifications are intended to be included within the scope of the following claims.

What is claimed is:

1. In an alarm system for a wheeled vehicle including a power source, a skid control system for controlling brake pressure with the use of output signals from a wheel revolution sensor, a fuse for connecting the skid control system with the power source, and an indication unit, a combination comprising:
 a dangerous fault condition detection unit connected to receive output signals from the skid control system;
 a first switching means included within the dangerous fault condition detection unit for enabling the indication unit and tearing the fuse when the skid control system is placed in its dangerous fault condition;
 a negligible fault condition detection unit; and a second switching means included within the negligible fault condition detection unit for enabling the indication unit without tearing the fuse when the alarm system or the skid control system is placed in its slight fault condition.

2. In an alarm system for a wheeled vehicle including a power source, a skid control system for controlling brake pressure with the use of output signals from a wheel revolution sensor, and a fuse for connecting the skid control system with the power source a combination comprising:
 a series circuit of a first indication unit and a diode connected to the fuse in a parallel fashion;
 a first switching means connected between ground potential and a junction of the fuse and the diode;
 a second switching means connected between ground potential and a junction of the first indication unit and the diode; a dangerous fault condition detection unit connected to receive output signals from the skid control system in order to close the first switching means when the skid control system is placed in its dangerous fault condition; and a negligible fault condition detection unit for closing the second switching means when the alarm system or the skid control system is placed in the light fault condition.

3. The alarm system of claim 2 wherein the negligible fault condition detection unit detects the voltage output of the power source.

4. The alarm system of claim 2 wherein the dangerous fault condition detection unit is responsive to a pressure reduction signal generated from the skid control system.

5. The alarm system of claim 2 further comprising:
 a second indication unit connected to the fuse in a parallel fashion; and a trigger circuit connected to the fuse in a parallel fashion of which output signal triggers the first switching means.

6. The alarm system of claim 5 wherein the first indication unit is an alarm lamp and the second indication unit is an alarm buzzer.

7. The alarm system of claim 2 wherein the first switching means is an SCR and the second switching means is a transistor.

8. The alarm system of claim 2 further comprising:
a third switch for connecting the fuse with the power source;
a fourth switch for generating an initial check signal;
an initial check circuit for closing the second switching means when the alarm system and the skid control system is placed in the normal condition upon generation of the initial check signal;
a velocity detection circuit for opening the second switching means when the velocity of the vehicle exceeds a predetermined value.

9. The alarm system of claim 8 wherein the second switching means is opened upon closing the third switch.

10. The alarm system of claim 8 wherein the third switch is an ignition switch of the vehicle.

11. The alarm system of claim 8 wherein the fourth switch is a stop switch associated with a brake foot pedal of the vehicle.

12. The alarm system of claim 1 wherein the negligible fault condition detection unit detects the voltage output of the power source.

13. The alarm system of claim 1 wherein the skid control system includes an actuator unit active for reducing brake pressure, thereby preventing a locked condition of the wheels of said wheeled vehicle, and the negligible fault condition detection unit detects a temporary malfunction of said actuator unit.

14. The alarm system of claim 1 wherein the dangerous fault condition detection unit is responsive to an abnormal pressure reduction signal generated by the skid control system.

15. The alarm system of claim 1 wherein the first switching means is an SCR.

16. The alarm system of claim 1 wherein the second switching means is a transistor.

17. The alarm system of claim 2 wherein the skid control system includes an actuator unit active for reducing brake pressure, thereby preventing a locked condition of the wheels of said wheeled vehicle, and the negligible fault condition detection unit detects a temporary malfunction of said actuator unit.

* * * * *